(12) United States Patent
Cantu et al.

(10) Patent No.: US 6,340,958 B1
(45) Date of Patent: *Jan. 22, 2002

(54) SOLAR POWERED PRICE DISPLAY SYSTEM

(75) Inventors: Gary R. Cantu, San Jose; James W. Pfeiffer, Los Gatos; Daniel B. Steinberg, Campbell, all of CA (US)

(73) Assignee: PricePoint, Incorporated, Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/895,498

(22) Filed: Jul. 16, 1997

Related U.S. Application Data

(63) Continuation of application No. 08/372,411, filed on Jan. 13, 1995, now abandoned.

(51) Int. Cl.[7] .................................................. G09G 3/00
(52) U.S. Cl. ............................ 345/2; 345/30; 235/383; 235/385; 340/825.49
(58) Field of Search ................................ 235/383, 385, 235/472; 340/825.07, 825.35, 825.49, 825.69, 825.72, 825.73, 825.75, 5.91, 597; 364/400, 401; 345/1–2, 30, 31; 705/28, 22, 23, 400, 416; 359/154

(56) References Cited

U.S. PATENT DOCUMENTS

| | | | |
|---|---|---|---|
| 3,921,310 A | * 11/1975 | Smeda et al. .................. 33/8 R |
| 4,529,980 A | * 7/1985 | Liotine et al. .......... 340/825.52 |
| 4,766,295 A | 8/1988 | Davis et al. ................. 235/383 |
| 4,855,725 A | 8/1989 | Fernandez ................... 340/706 |
| 4,888,709 A | * 12/1989 | Revesz et al. .......... 340/825.15 |
| 4,962,466 A | 10/1990 | Revesz et al. ............... 364/518 |
| 5,019,811 A | 5/1991 | Olsson et al. .......... 340/825.17 |
| 5,063,380 A | * 11/1991 | Wakura .................. 340/825.49 |
| 5,172,314 A | 12/1992 | Poland et al. ............... 364/401 |
| 5,198,644 A | * 3/1993 | Pfeiffer et al. .............. 235/383 |
| 5,241,467 A | 8/1993 | Failing et al. ............... 364/401 |
| 5,245,534 A | 9/1993 | Waterhouse et al. ......... 364/404 |
| 5,264,822 A | * 11/1993 | Vogelman et al. ..... 340/825.35 |
| 5,307,193 A | * 4/1994 | Van Zeeland et al. .. 340/825.69 |
| 5,361,871 A | * 11/1994 | Gupta et al. ................. 235/383 |
| 5,406,271 A | * 4/1995 | Sonnedorfer et al. .. 340/825.35 |
| 5,465,085 A | * 11/1995 | Caldwell et al. ....... 340/825.35 |
| 5,548,282 A | * 8/1996 | Escritt et al. .......... 340/825.35 |
| 5,565,858 A | * 10/1996 | Guthrie .................. 340/825.35 |
| 5,929,770 A | * 7/1999 | Faita ..................... 340/825.35 |

FOREIGN PATENT DOCUMENTS

| | | | |
|---|---|---|---|
| WO | WO 94/11833 | 5/1994 | ........... G06F/15/21 |
| WO | 95 25300 | 9/1995 | ........... G06F/3/147 |

* cited by examiner

*Primary Examiner*—Lun-Yi Lao
(74) *Attorney, Agent, or Firm*—Skjerven Morrill MacPherson LLP; David E. Steuber

(57) ABSTRACT

An information display system comprises a controller, a ceiling node, a rail, an end cap and a solar powered display module. The display module stores and displays information. The controller communicates with the end cap through an IR downlink and an RF uplink, and the end cap communicates with the display module by wired communication. By uniquely combining RF and IR communication systems in the information display system, communication between the controller and the module is fast and accurate and the display module's power consumption is significantly reduced to make a solar powered information display system practical. By a unique power bus, excess power is shared.

26 Claims, 15 Drawing Sheets

SOLAR POWERED PRICE DISPLAY SYSTEM

This application is a continuation division of application Ser. No. 08/372,411, filed Jan. 13, 1995, now abandoned.

FIELD OF THE INVENTION

This invention relates to information display systems, and particularly to ambient light powered information display systems suitable for use with shelving of the kind used in supermarkets, stores, and the like.

BACKGROUND INFORMATION

Information display systems are commonly used in applications where products for sale are placed on shelves. These systems typically display information, such as the name of the product, price, unit price, and product identification codes, on rails attached to the shelves, with the information placed directly above or below the product. These systems are used to provide the information to customers and to facilitate product ordering and inventory control.

Some of these systems use electronic display modules which require a power source to power the display module. A controller may be used to communicate with the display modules to change and confirm the display information.

In one such system, multiple conductors are used both carry to power and to communicate with the display modules. However, the wiring necessary to implement this system is complex and expensive. Further, once installed, this system is difficult to change when the gondola containing the shelving must be moved, as often occurs for replacement, remodelling or marketing reasons.

In another system, radio frequency (RF) signals are used to communicate with individual electronic displays to change the information displayed. Each display module is provided with an RF transmitter and receiver to communicate with the controller. These systems are costly because the RF transceivers are costly. Another problem with such systems is that the RF transceivers practical for such systems have limited range and require that the receiver be located nearby. In one such system, for example, a receiver or remote antenna must be located above each gondola. The multiple RF receivers greatly increase the cost of such systems. Moreover, the use of RF bands is controlled by government regulations. Because the regulations vary from country to country, the RF systems are not easily "portable"; i.e., they may need to be customized for each country to meet its regulations.

Another type of system uses an infra-red (IR) communication system to control display modules. Each display module is self powered by a photovoltaic cell and is provided with an IR transmitter and receiver. This system is able to use photovoltaic power (sometimes called "solar power") because IR systems require less power to operate than RF systems. However, the IR transmitter in each display module must be relatively weak to reduce power consumption, and thus the controller must have an IR receiver placed within short range and preferably within line of sight of each display module. Even so, the display module must also limit its transmissions to restrict its power consumption.

Although an IR system uses less power than an RF system, a large solar cell is needed to power each display, which in turn makes the display module relatively large. A large module may not be usable with smaller products and closely spaced shelf facings and may detract from the appearance of the products placed on the shelves. Of course, the larger photovoltaic cell tends to increase the cost of the display module.

An assumption underlying the prior art systems in general is that a single transmission spectrum (i.e., RF or IR) should be used to communicate in both directions with the display modules.

SUMMARY

In accordance with this invention, an information display system comprises a controller, a ceiling node a rail, an end cap, and a solar powered display module. The display module stores and displays information. The controller, among other functions, communicates with the display module, via the ceiling node, to update and verify the information in the display module. The ceiling node communicates with the display module, via the end cap through an IR downlink and an RF uplink. The IR transmitter transmits a relatively high power signal to ensure good reception with a high sensitivity but low power IR receiver. The RF transmitter is a relatively low power transmitter which may be, for example, similar to those commonly used in remote control devices which are not tightly controlled by the RF communication regulations in most countries. By combining RF and IR communication systems in the information display system, not only is communication between the controller and the module accurate and robust, but also the module's size and power consumption are reduced to make a solar-powered information display system practical.

For supermarket applications, one embodiment of the present invention comprises a network computer, a controller, a plurality of ceiling nodes, a plurality of self-powered end caps mounted to individual shelves or gondolas, and a plurality of solar powered display modules wired to each end cap via a wired rail. Each display module displays price information for a corresponding product and provides excess solar power to charge an energy storage device in the end cap to which the display module is coupled. This permits the sharing of power among the display modules that are coupled to a particular end cap and eliminates any additional wiring needed to power the end cap.

The network computer sends price information to the controller to broadcast to the individual display modules via the ceiling nodes and end caps, thus allowing the user to quickly and automatically update prices for its products. The display module includes an optical port, which allows Universal Product Code (UPC) information to be entered directly into a display module by a portable UPC reader device to easily and accurately reprogram the display module for a different product. The RF uplink allows the display module to communicate with the controller and to verify the programmed UPC information.

DETAILED DESCRIPTION

Figure 1:
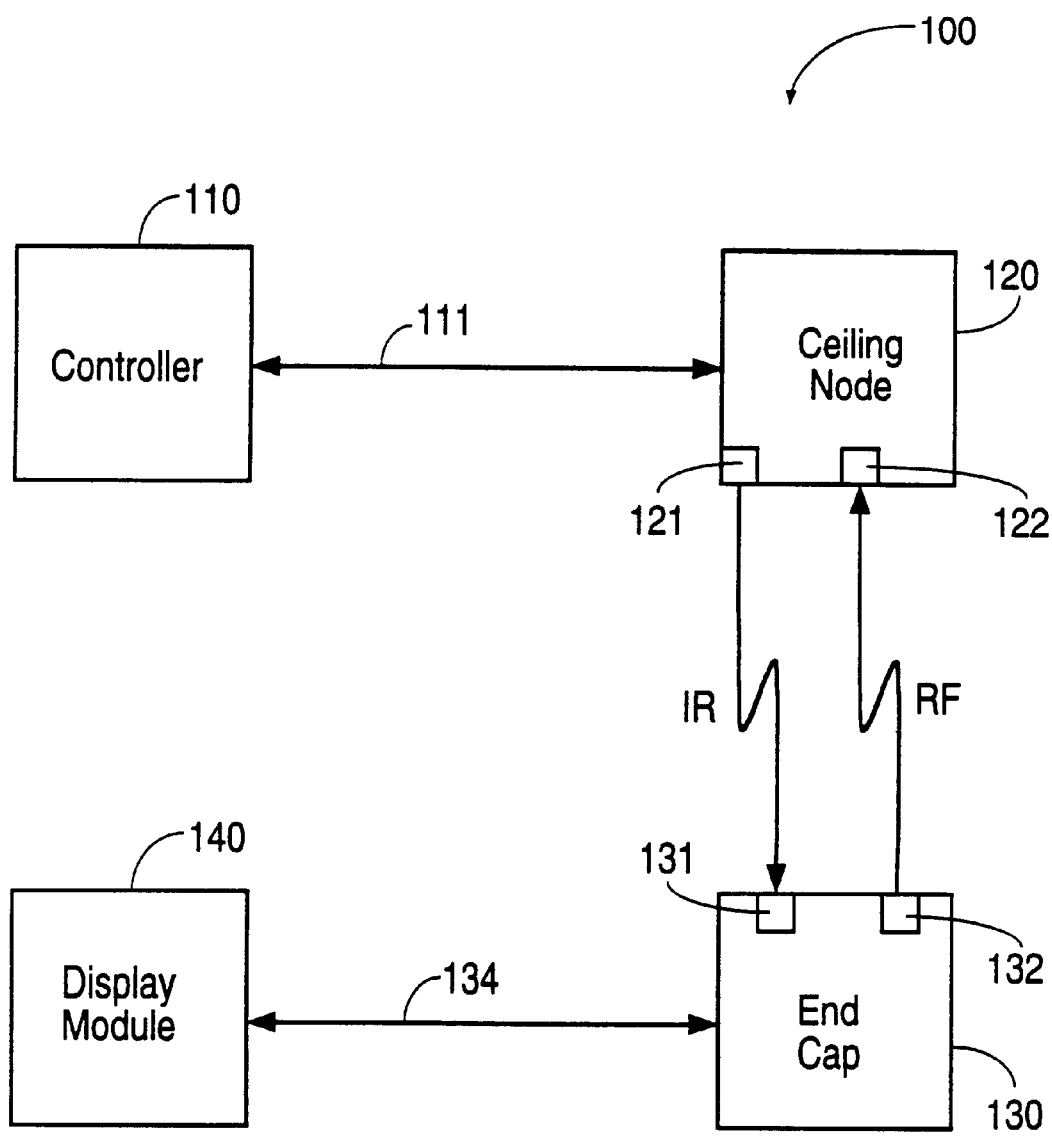
FIG. 1 shows a block diagram of an information display system according to one embodiment of the present invention.

FIG. 1 shows a block diagram of an information display system 100 according to one embodiment of the present invention. A controller 110 is coupled to a ceiling node 120 by an interconnect bus 111. An end cap 130 is coupled to a solar-powered display module 140 by a plurality of conductors 134. Display module 140 is preferably a display module such as the display module described in application Ser. No. 08/219,666 filed with the United States Patent and Trademark Office by James W. Pfeiffer and Gary R. Cantu, which is incorporated herein by reference in its entirety. Display module 140 can be electronically controlled by controller 110 to change the displayed information.

Controller 110 sends a message to display module 140 by first sending a message to ceiling node 120 over bus 111. In this embodiment, controller 110 sends a serial message to ceiling node 120 at 19.2 K Baud. Ceiling node 120 receives the message and broadcasts the message to end cap 130 by using a relatively high power IR transmitter 121. End cap 130 receives the IR message using a micro-power IR receiver 131. This communication path is hereinafter called the IR downlink. The IR transmitter 121 in the ceiling node 120 transmits an IR signal at a sufficient power level to achieve a sufficiently high signal level at IR receiver 131 in the end cap. Thus, IR receiver 131 is a simple, inexpensive low power IR receiver, such as model BX-1407 made by Sony Corp., which can accurately receive messages from the ceiling node even when the IR transmitter is not in direct line-of-sight of the IR receiver. IR transmitter 121 is preferably coupled to an external power source so that power consumption is not critical.

IR communications are typically not subject to stringent government regulations as are RF communications. Thus, the IR downlink can be high-powered and does not need to be customized to comply with different regulations in different countries and jurisdictions. End cap 130 transmits the message to display module 140 via a data bus 134. In this embodiment, end cap 130 transmits the message to the display module at 1024 Baud.

Display module 140 sends a message to controller 110 via end cap 130 and ceiling node 120. Display module 140 sends a message over the data bus 134 to end cap 130. End cap 130 receives the message and broadcasts the message to ceiling node 120 using a micropower RF transmitter 132, such as the type commonly used in remote controls. Ceiling node 120 receives the RF message using an RF receiver 122. RF receiver 122 is a very sensitive RF receiver, such as model RB1018 made by RFM Technologies, to accurately receive the RF message sent by end cap 130. This communication path is hereinafter called the RF uplink. The low power and frequency band (e.g., 318 MHz–418 MHz) of micropower RF transmitter 132 complies with the RF regulations of most, if not all, countries. Thus, the RF uplink is easy to customize for international operation.

In information display system 100, the low power requirements of RF transmitter 132 and IR receiver 131 allow the end cap 130 to be powered by an energy storage device supported by a photovoltaic cell in the display module 140, thereby eliminating the need to connect external power lines to the end cap. Further, the use of the IR downlink and the RF uplink eliminates the cost, complexity and inflexibility of wired communication systems.

Figure 2:
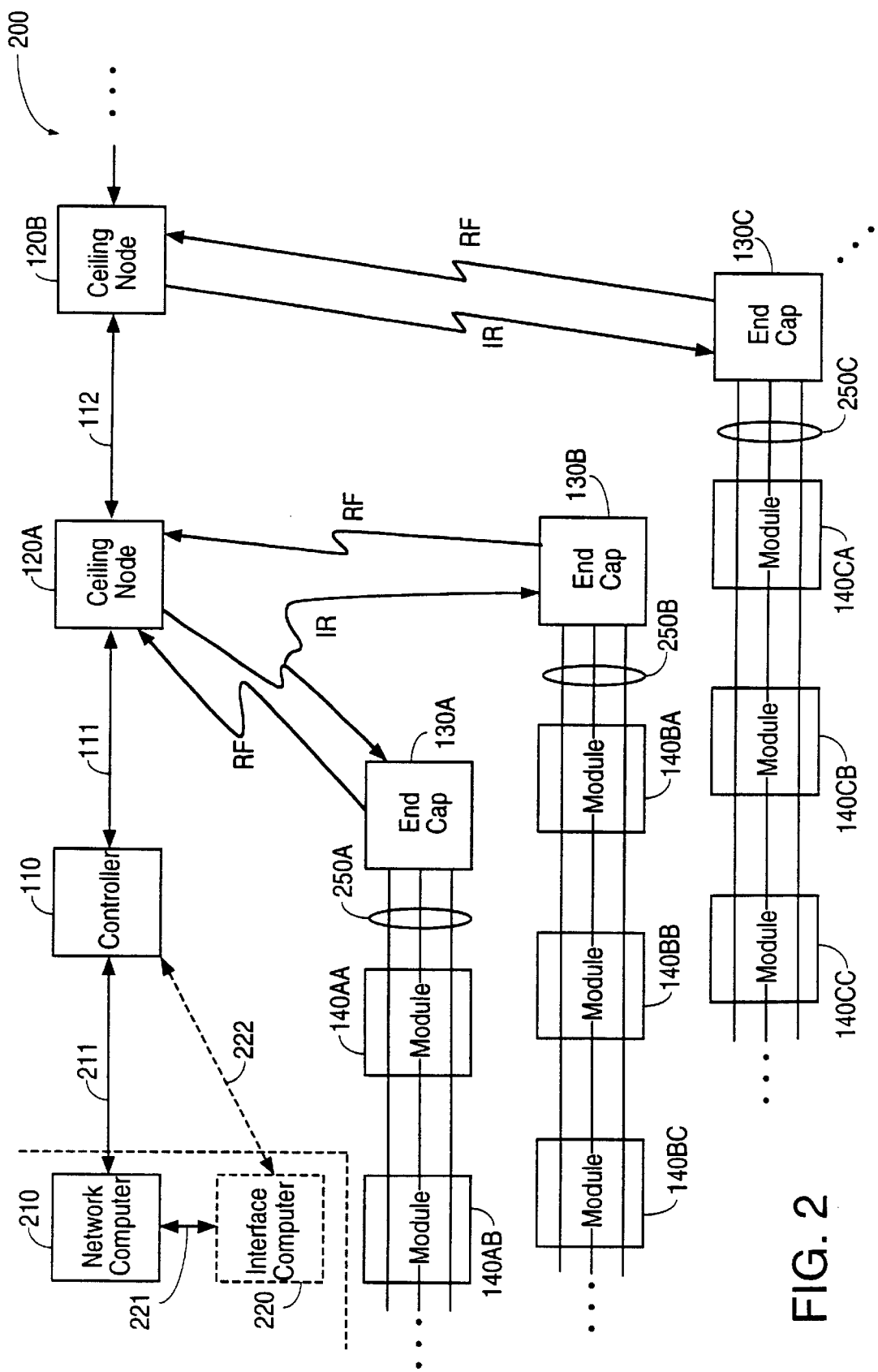
FIG. 2 shows a block diagram of an information display system according to another embodiment of the present invention.

FIG. 2 shows a block diagram of information display system 200 according to another embodiment of the present invention. Information display system 200 is basically an expanded version of information display system 100 (FIG. 1) for use in a retail store, such as a supermarket. Information display system 200 comprises controller 110, a plurality of ceiling nodes 120A, 120B, etc., a plurality of end caps 130A, 130B, 130C, etc., and a plurality of display modules 140AA, 140AB, 140BA, 140BB, 140CA, 140CB, etc. For clarity, the same reference numerals are used between drawings for elements that have the same function and interconnection. Accordingly, the display modules 140AA, etc., are solar powered and the end caps 130A, etc., can use solar power and/or stored energy from an internal storage device within a corresponding one of end caps 130A, etc.

Typically, a supermarket has a network computer 210 that stores and accesses the pricing information for the supermarket's numerous products. This pricing information is transmitted to controller 110 over a bus 211 for distribution to the display modules. In this embodiment, bus 211 is a RS-232 bus. However, bus 211 may be any suitable bus standard compatible with network computer 210. Alternatively, network computer 210 may communicate with controller 110 via a bus 221 to an interface computer 220, which communicates with controller 110 over an RS-232 bus 222. Interface computer 220 is useful in embodiments where a second information display system is also used.

Controller 110 communicates with the ceiling nodes 120A, etc., over bus 111 coupled to ceiling node 120A, which is daisy chain coupled to ceiling nodes 120B, 120C, etc. via bus 112. Sufficient ceiling nodes to cover the supermarket's entire floor area are used to communicate with all the display modules. The ceiling nodes communicate with the end caps via an IR downlink and a RF uplink. Each of end caps 130A, etc., communicates with a group of display modules over one of rail buses 250A, etc. Network computer 210 uses information display system 200 to quickly and easily update the information displayed by the display modules. Further, information display system 200 eliminates the need for communication wiring between controller 110 and the end caps, thereby allowing the user to rearrange shelving without having to rewire the system.

In this embodiment, each end cap in information display system 200 is assigned a node number, which facilitates communication on both the RF uplink and IR downlink. In IR downlink communication, each end cap will only respond to messages containing its node number. The message may also contain UPC information and pricing information, which the end cap transmits on rail buses 250A, etc. Each display module on one of rail buses 250A, etc. is programmed with the UPC number of its corresponding product and only accepts information in messages containing its UPC number. In other embodiments, the message may contain European Article Numbers (EAN) information instead of UPC information, stock keeping unit (SKU), etc. or any unique identification numbers.

Figure 3:
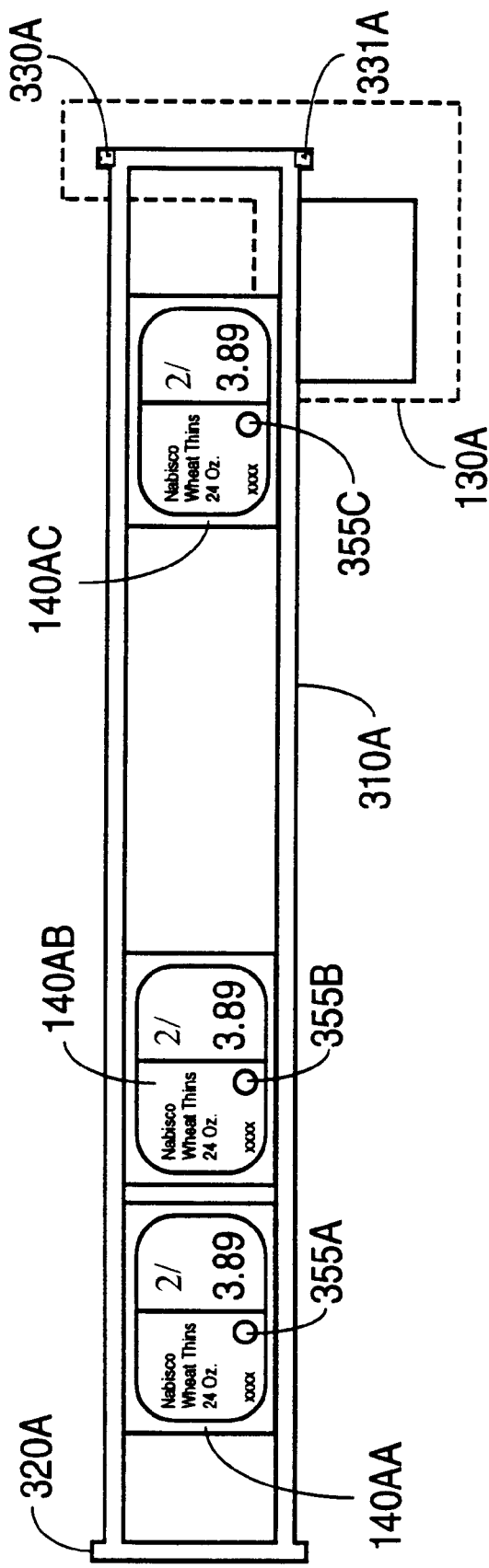
FIG. 3 shows display modules mounted in a rail.

FIG. 3 shows display modules 140AA, 140AB and 140AC mounted in a rail 310A. A cosmetic end cap 320A is attached to one end of rail 310A. End cap 130A, comprising IR photodetectors 330A and 331A, is mounted on the other end of rail 310A. Photodetectors 330A and 331A detect IR signals transmitted by ceiling node 120A (FIG. 2) and are the sensors of IR receiver 131 (FIG. 1). Also, each display module 140AA, etc. has an optical port 355A, etc., which is described further below.

Figure 3A:
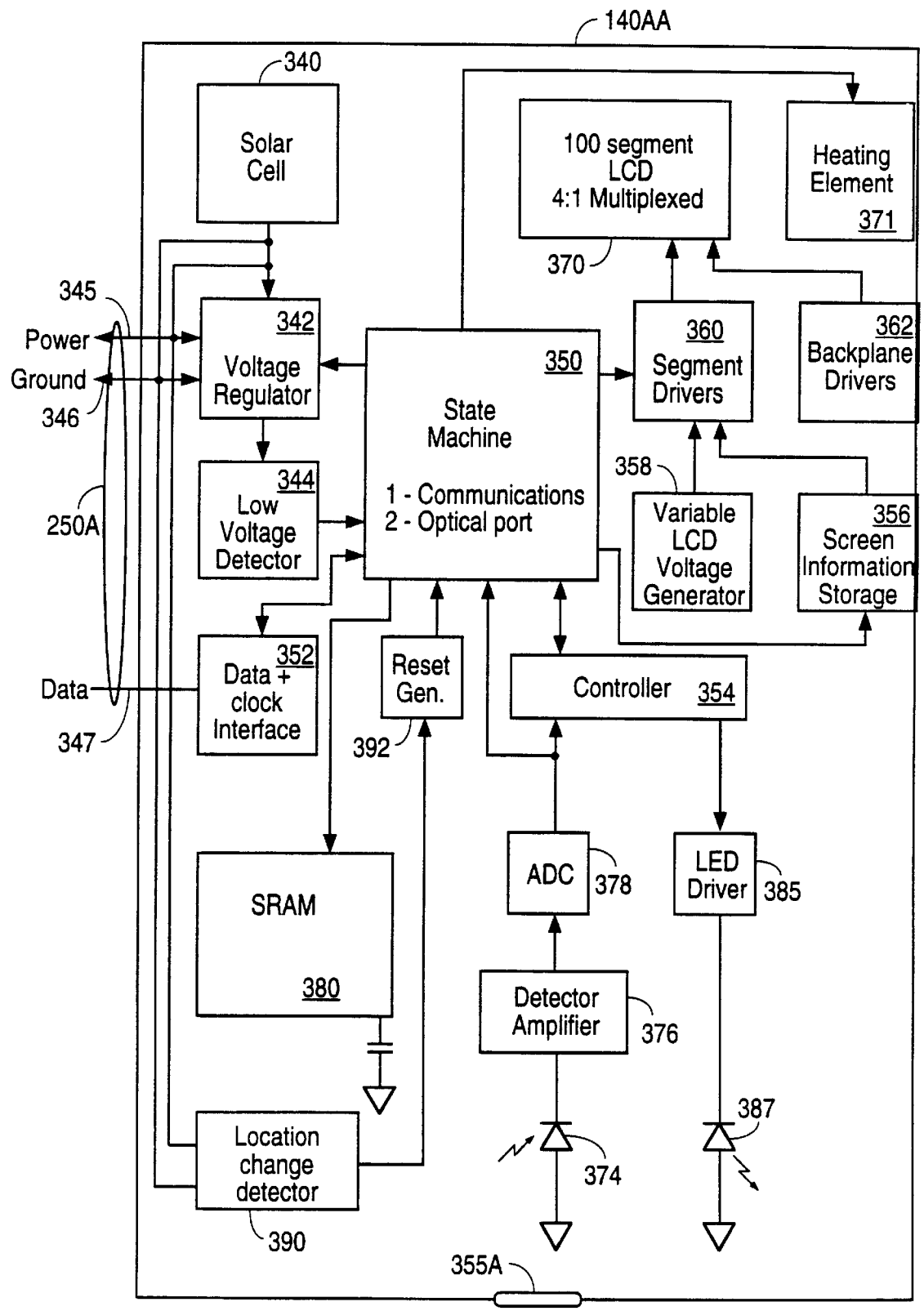
FIG. 3A shows an internal block diagram of a solar powered module.

FIG. 3A shows a block diagram of one embodiment of a display module 140AA. FIG. 3A applies equally well to the other display modules 140AB, 140BA, 140CA, etc. Display module 140AA is self-powered by a photovoltaic cell (sometimes called solar) cell 340. Photovoltaic cell 340 generates electrical energy from light energy, which a voltage regulator 342 regulates to a desired voltage to supply power to the rest of display module 140AA. A low voltage detector 344 is coupled to a power line 345 and a ground line 346 in rail bus 250A and generates a signal when it detects a low voltage condition. Photovoltaic cell 340 is also connected to power line 345 and ground line 346 in rail bus 250A, and consequently, the photovoltaic cells of all of the display modules connected to rail bus 250A are connected in parallel. As a result, the voltage present between power and ground lines 345 and 346 is approximately the average of the voltages generated by the photovoltaic cells of all of the display modules connected to rail bus 250A. This feature allows the display modules to share power, which is advantageously used to provide sufficient power to an under-illuminated display module.

In operation, a state machine 350 controls the display module to communicate over the rail bus 250A during a communication cycle with the end cap, or during receipt of UPC information through an optical port 355A. During communication mode, state machine 350 controls a data and clock interface 352 to receive a data signal containing information from the end cap 130A (FIG. 2) over a data line 347 in rail bus 250A. Data and clock interface 352 separates the data signal embedded in the clock signal to extract the transmitted information. State machine 350 controls storage of display information to a screen information storage memory 356. Screen information storage memory 356 together with a variable LCD voltage generator 358, segment drivers circuit 360 and backplane drivers 362 drive a liquid crystal display (LCD) 370 to display the stored information. LCD 370 is preferably up to a 100 segment TN LCD. Alternatively, LCD 370 may be a 81 segment LCD. Optionally, a heating element 371 may be used to heat LCD 370 for performance improvement in low temperature applications.

Photodetector 374 detects light signals transmitted through optical port 355A from outside display module 140AA, and generates an analog output signal that is amplified by a detector amplifier 376. The IR signal may come from a portable UPC reader (not shown), or alternatively, from ambient light by covering and uncovering optical port 355A, which causes photodetector 374 to generate an analog output signal.

An analog-to-digital converter (ADC) 378 receives the signal from detector amplifier 376 and provides the signal in digital form to state machine 350. In response, state machine 350 enters an optical port communication mode and stores the signal transmitted through optical port 355A in a static random access memory (SRAM) 380 and changes the displayed information if required. State machine 350 can also read data out of SRAM 380 and send this data out on data line 347 in rail bus 250A through data and clock interface 352. The optical port can also communicate information to an external device via an LED and driver, 387 and 385 respectfully.

A location change detector 390 is connected to power and ground lines 345 and 346 in rail bus 250A. As a result, when display module 140AA is removed from rail bus 250A, location change detector 390 is disconnected from the power and ground lines and sets a bit in SRAM memory 380. When display module 140AA is reconnected to a rail bus, this bit is tested by a reset generator 392, which may optionally cause display module 140AA to enter an initial state where display module 140AA does not display any information. In this case, to display information, display module 140AA must be reprogrammed as described below in conjunction with FIG. 10. When this feature is chosen, a display module cannot be moved to another location without being reprogrammed to protect against a display module displaying the information for an unintended product.

In a typical supermarket, the shelves used to hold products are mounted on gondolas, several shelves to a side. Rail 310A is mounted to the front face of a shelf. In this embodiment, display modules 140AA, 140AB and 140AC are located on rail 310A below each product or group of products to display desired information, such as name, price, and unit price, corresponding to the product or group of products. Rail 310A includes rail bus 250A (FIG. 2).

Under typical lighting conditions, the photovoltaic cell in each of display modules 140AA, etc. (FIG. 3) generates excess power. The photovoltaic cell of each display module is connected to the rail bus. Thus, in embodiments where the end cap uses an energy storage device (described further in connection with FIG. 6) as a power source, the excess power generated by the display modules is used to recharge or "float" the energy storage device 660. Because of the low power requirements of the end cap and display modules, the solar power source in the display modules can maintain the charge in the energy storage device for the useful life of information display system 100.

Figure 4:
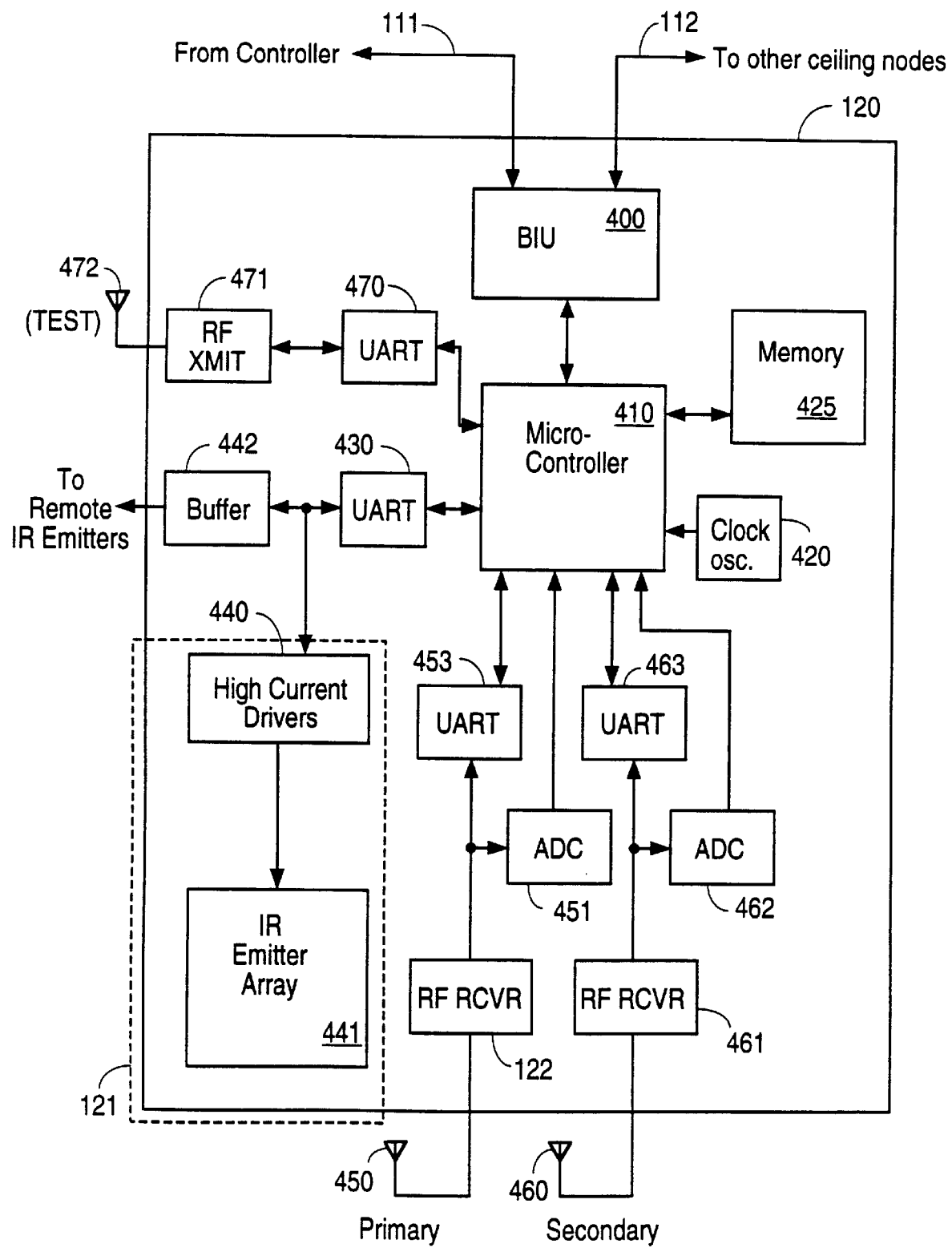
FIG. 4 shows a block diagram of a ceiling node according to one embodiment of the present invention.

FIG. 4 shows a block diagram of ceiling node 120 according to one embodiment of the present invention. A bus interface unit (BIU) 400 is coupled between a microcontroller 410 and bus 111 to facilitate communication between ceiling node 120 and controller 110 (FIG. 2) and is daisy-chain connected to other ceiling nodes through bus 112. A clock oscillator 420 generates clock signals to operate a microcontroller 410. Microcontroller 410 also reads and writes to a memory 425, which includes ROM and RAM.

Ceiling node 120 operates to perform IR downlink communication as follows. Messages from controller 110 (FIG. 2) to the display modules are received by BIU 400. Microcontroller 410 operates to transmit the message through a UART module 430 and IR transmitter 121, which comprises high current drivers 440 and an IR emitter array 441. In this embodiment, IR emitter array 441 comprises several light emitting diodes (LEDs) that are arranged to produce a large cone of IR radiation directed toward the floor of the supermarket. The current produced by high current drivers 440 is modulated to retransmit the message as an analog IR signal. Remote IR transmitters similar to IR transmitter 121 may be coupled to microcontroller 410 through a buffer 442 to achieve greater floor coverage. The receiving end cap sends an acknowledge message via the RF uplink when the message is received.

Ceiling node 120 operates to perform RF uplink communication as follows. A message from the transmitting end cap is received by RF receiver 122 through an antenna 450. The RF message signal is converted to digital form by a UART 453. Received signal strength is measured by an analog-to-digital converter (ADC) 451, which is coupled to the output of RF receiver 122. Microcontroller 410 receives the message in digital form from UART 453 and retransmits it to controller 110 (FIG. 2) via BIU 400 and bus 111. An antenna 460, a RF receiver 461, an ADC 462 and UART 463 operate as a spare RF channel tuned to a different frequency for testing and expansion. Also for test purposes, microcontroller 410 may transmit RF messages to other ceiling nodes through a UART module 470, an RF transmitter 471 and an antenna 472.

Figure 5:
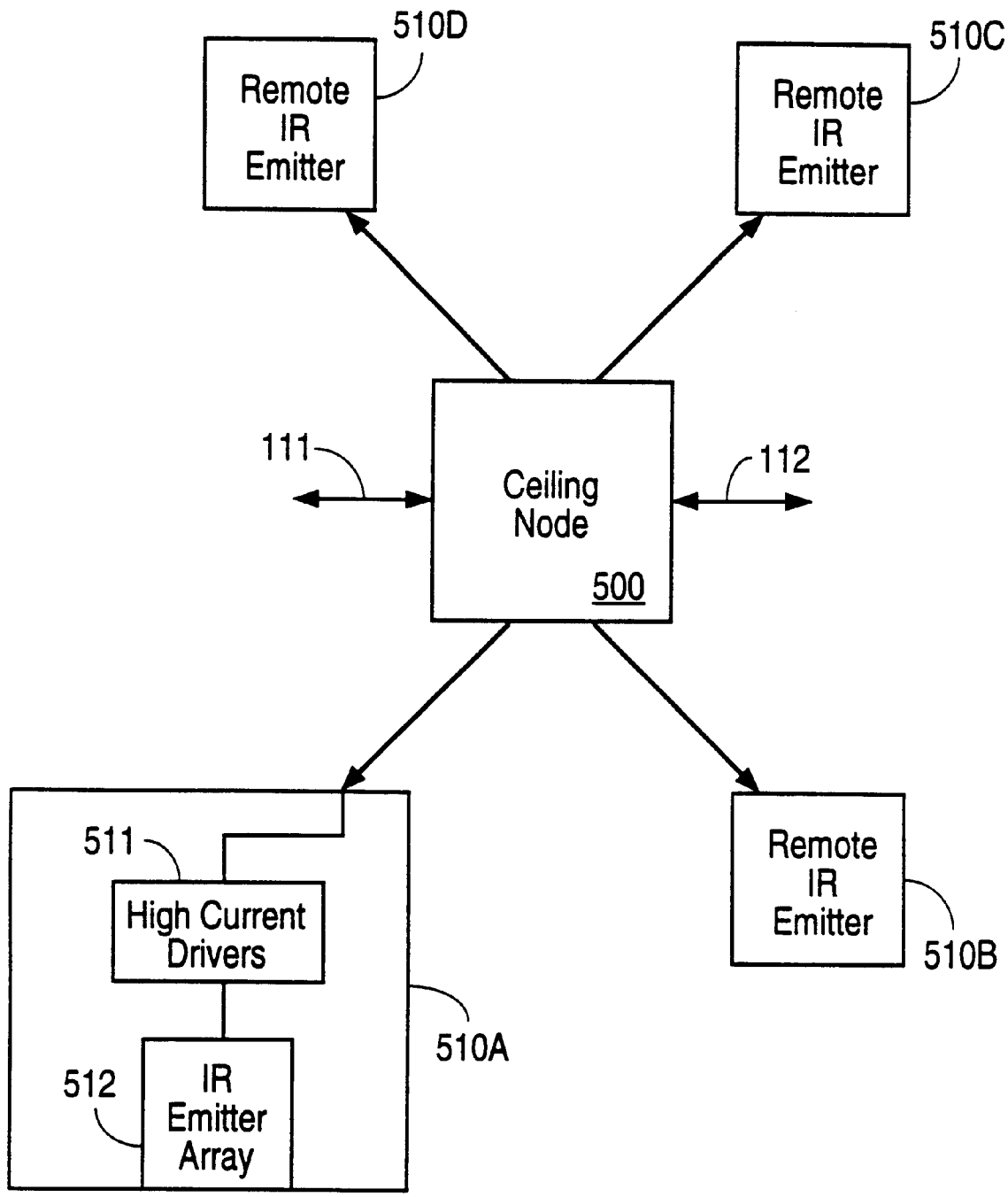
FIG. 5 shows a block diagram of a ceiling node coupled to remote IR emitters according to one embodiment of the present invention.

FIG. 5 shows a block diagram of a ceiling node 500 wired to remote IR emitters according to one embodiment of the present invention. Ceiling node 500 is coupled to a remote IR emitter 510A having high current drivers 511 and an IR emitter array 512 substantially identical with IR transmitter 121 (FIG. 4). In this embodiment, ceiling node 500 is coupled to three other remote IR emitters 510B–D, each substantially identical with remote IR emitter 510. The remote IR emitters can be used to avoid "dead spots" in the IR downlink. Of course, the number of remote IR emitters can be any number sufficient to achieve the desired floor coverage.

Figure 6:
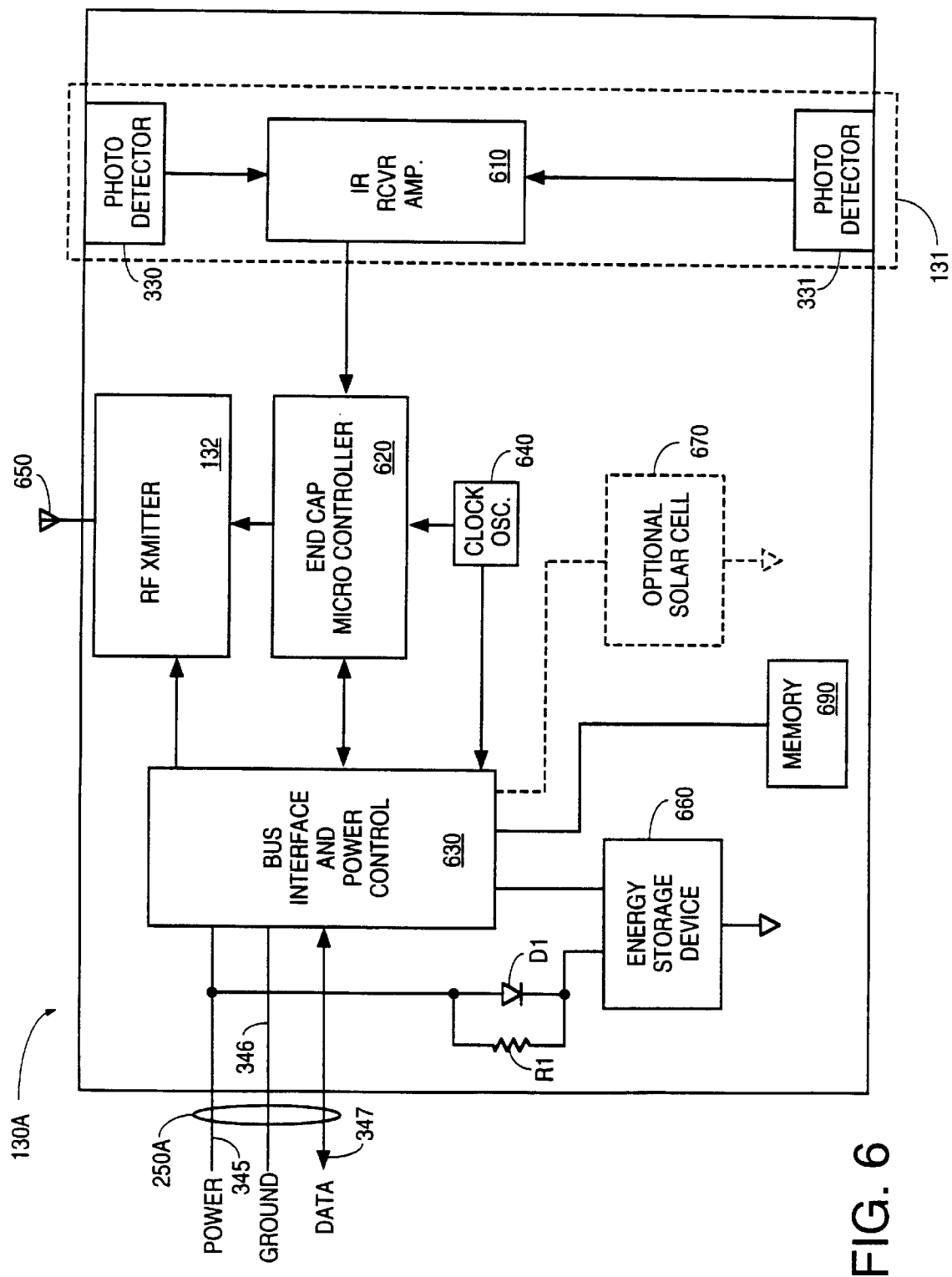
FIG. 6 shows a block diagram of an end cap according to one embodiment of the present invention.

FIG. 6 shows a block diagram of end cap 130A according to one embodiment of the present invention. The other end caps 130B, etc. are substantially identical. IR receiver 131 comprises photodetector 330 directed upward for sensing IR signals sent from the ceiling, photodetector 331 directed downward for sensing IR signals reflected from the floor, and an IR receiver amplifier 610 coupled to photodetectors 330 and 331. The output of IR receiver amplifier 610 is coupled to end cap microcontroller 620. In IR downlink communication, photodetectors 330 and 331 convert sensed IR signals into electrical signals, which IR receiver amplifier 610 amplifies and transmits to end cap microcontroller 620. Microcontroller 620 operates on the commands embedded in the message and may then retransmit the message it received from IR receiver amplifier 610 onto rail bus 250A through a bus interface and power control circuit (BIPC) 630. A clock oscillator 640 generates the clock signals necessary to operate the bus interface, microcontroller 620, and the communications drivers.

BIPC 630 also receives messages transmitted by display modules coupled to rail bus 250A and sends the messages to end cap microcontroller 620. End cap microcontroller 620 controls RF transmitter 132 to retransmit the message in modulated RF signals via an antenna 650.

In this embodiment, IR detectors 330 and 331 together require approximately 10–25 microamps of current while constantly operating so as to detect any incoming IR signal. Signal reception is good because ceiling node 120 uses a high power IR transmitter. Micropower RF transmitter 132 uses approximately 7 milliamps of current during transmission.

End cap 130A is powered by an energy storage device 660, and/or optionally, a large area photovoltaic cell. Energy storage device 660 can be a small rechargeable battery or a low leakage high value capacitor. Further, energy storage device 660 can be recharged using the excess power generated by the solar powered display modules coupled to rail bus 250A. Power and ground lines 345 and 346 are coupled to the photovoltaic cells of all the display modules attached to rail bus 250A, which allows end cap 130A and the attached display modules to share power. Current flows from power line 345, through a diode D1, to recharge energy storage device 660. Diode D1 prevents the attached display modules from draining energy storage device 660.

Similarly, power from end cap 130A can be shared with the display modules coupled to rail bus 250A. End cap 130A can provide power to power and ground lines 345 and 346, which is then shared between the display modules coupled to power and ground lines 345 and 346 as described above in conjunction with FIG. 3A.

BIPC 630 monitors the status of energy storage device 660 and controls the activity of end cap microcontroller 620 and clock oscillator 640 to adapt end cap power 130A's consumption to power availability. For example, when BIPC 630 detects a non-charging condition, BIPC 630 generates a sleep signal to display modules 140AA, etc. (FIG. 2), which suspends most activity except for price display. Energy storage device 660 supplies a minimal current through resistor R1 to maintain memory in display modules 140AA, etc. Alternatively, BIPC 630 can control clock oscillator 640 to reduce the clock frequency, which reduces the power consumption of both clock oscillator 640 and end cap microcontroller 620, as well as bus 250A and module 140AA (FIG. 2).

End cap microcontroller 620 is coupled to memory 690, which is used to store the end cap's node number and the UPC and pricing information for each display module coupled to rail bus 250A. In one embodiment, memory 690 is a nonvolatile memory.

Figure 7:
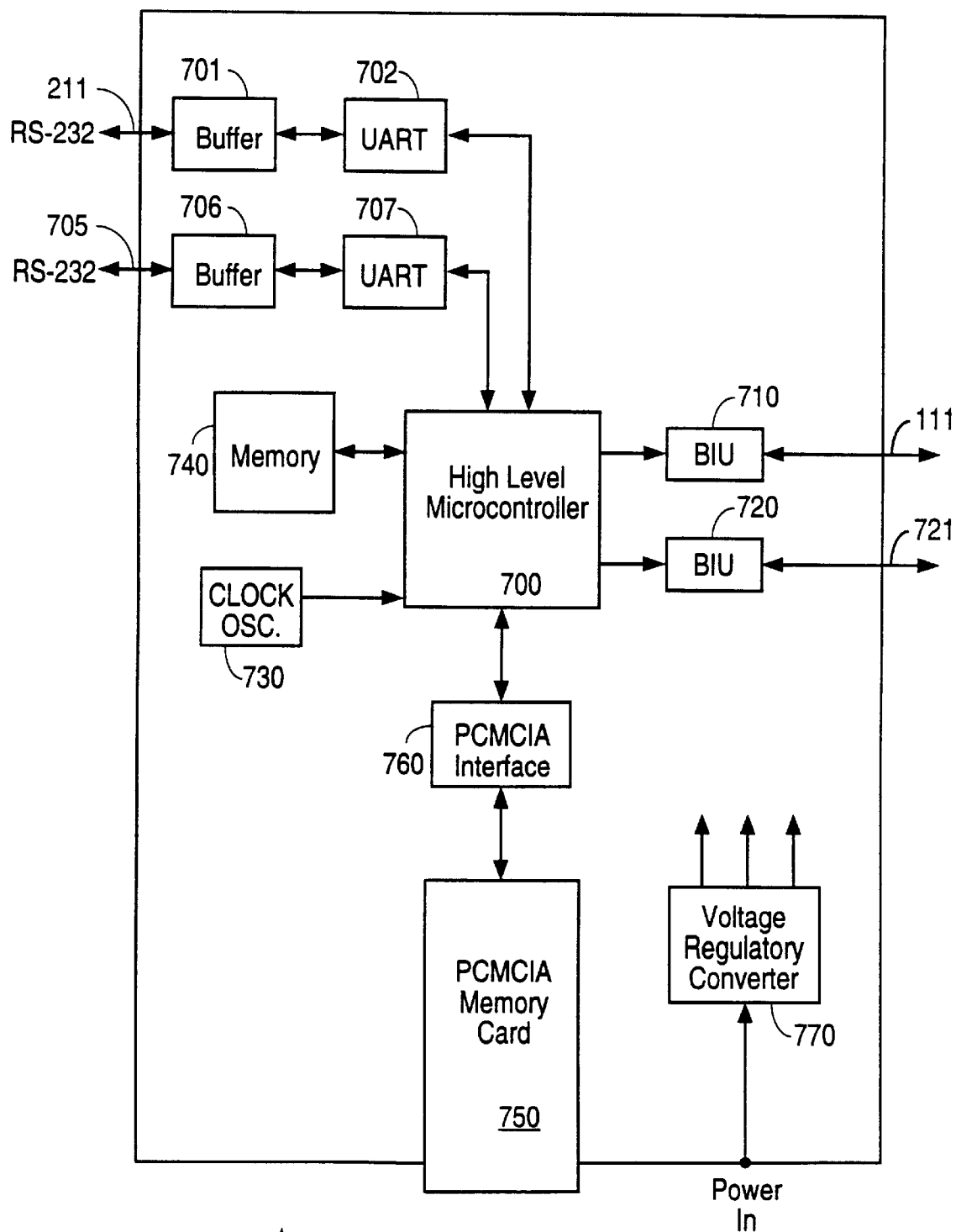
FIG. 7 shows a block diagram of a controller according to one embodiment of the present invention.

FIG. 7 shows a block diagram of controller 110 according to one embodiment of the present invention. Controller 110 communicates with network computer 210 (FIG. 2) over bus 211, which in this embodiment is a RS-232 bus. Messages from network computer 210 are received by a high level microcontroller 700 via a buffer 701 and a UART module 702. A bus 705 is a spare RS-232 bus serviced by a buffer 706 and a UART module 707. High level microcontroller 700 retransmits the message received on bus 211 to the ceiling nodes 120A, 120B, etc.(FIG. 2) via a bus interface unit (BIU) 710 and bus 111. For expansion purposes, a second BIU 720 is provided to communicate over a bus 721 to a second group of ceiling nodes.

A clock oscillator 730 provides the clock signals needed to operate high level microcontroller 700. A memory 740 contains ROM, which can be used for storing start-up microcode, and RAM, which can be used to store data and program microcode. A Personal Computer Memory Card Interface Association (PCMCIA) memory card 750 provides removable memory capacity, which is accessed by high level microcontroller 700 through a PCMCIA interface circuit 760. Controller 110 can be easily reprogrammed by replacing PCMCIA memory card 750 with another memory card loaded with a different program. This feature can be used to easily customize controller 110 to interface with different network computers (FIG. 2).

Controller 110 is powered by an external power source (not shown) coupled to a voltage regulator and converter 770. In some embodiments, the external power source supplies unregulated 24 VDC, which is converted by voltage regulator and converter 770 to the regulated voltages needed to operate the circuitry of controller 110.

Figure 8:
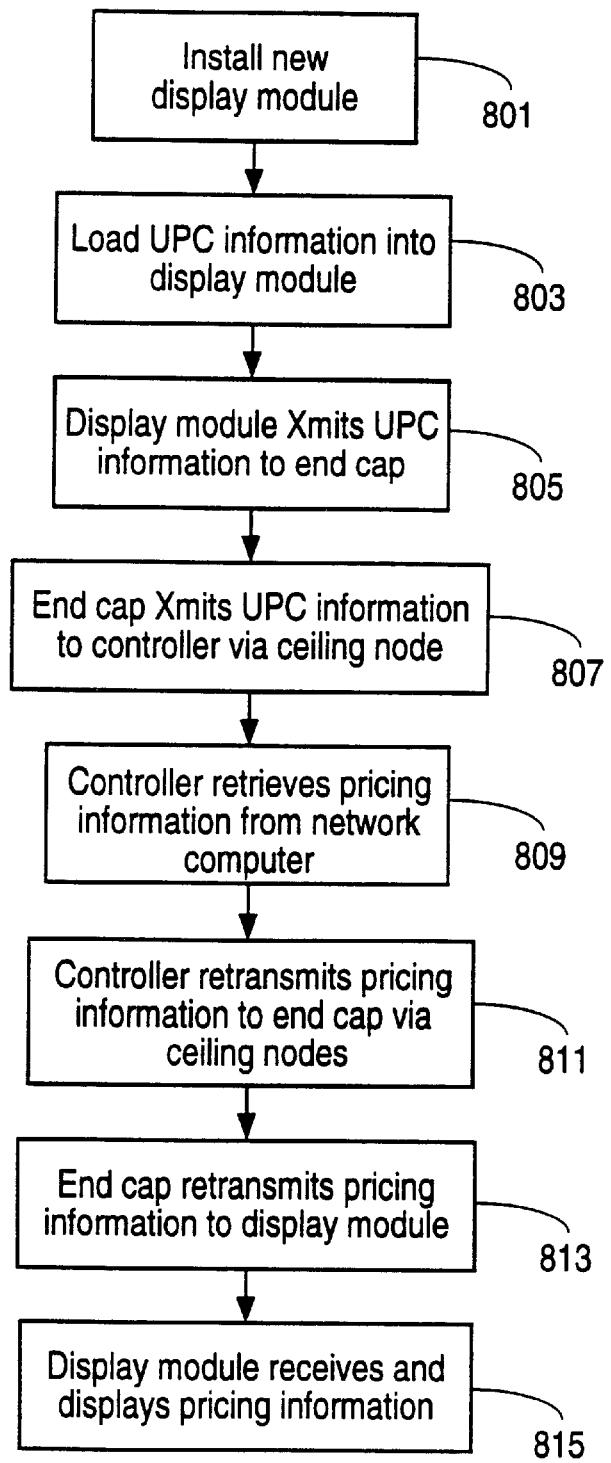
FIG. 8 shows a flow diagram of the process to install the information display system.

FIG. 8 shows a flow diagram of the process to install a new module 140 into information display system 200 (FIG. 2) according to one embodiment of the present invention. In step 801, a display module is installed in rail 310 (FIG. 3) aligned with the product for which it is going to display the information.

In step 803, the user loads the UPC information of the product into the display module's memory by reading the UPC directly from the product container using the wand of a portable UPC reader and transmitting the UPC information into the display module by placing the wand on the display module's optical port. In other embodiments, EAN information is read and loaded instead of UPC information. It is understood that any product identification code can be substituted for UPC or EAN information.

In step 805, the display module transmits the UPC information to the end cap over rail bus 250 (FIG. 2) to the end cap, which stores the UPC information in memory 690 (FIG. 6).

In step 807, the end cap then sends the UPC information to controller 110 (FIG. 2) using the RF uplink to transmit the information to a ceiling node, which retransmits it via bus 111 to controller 110. The controller records the UPC information with the node number (described in FIG. 2) of the end cap so that it can later communicate with that particular end cap to update pricing information in the display module corresponding to the product having that UPC.

In step 809, the controller communicates with network computer 210 (FIG. 2) over bus 211 to retrieve the pricing information for the product having that UPC.

In step 811, the controller transmits the pricing information to a ceiling node, which retransmits the pricing information to the end cap over the IR downlink. If the information was received incorrectly, the end cap will send a "retransmit" message to the controller via the RF uplink.

In step 813, the end cap issues an acknowledgment to the controller over the RF uplink to confirm receipt of the message. The end cap retransmits the pricing information over the rail bus to the display module.

In step 815, the display module receives the pricing information, sends an acknowledge message to the controller via end cap 130 over the RF uplink to ceiling node 120 within a specified time window of receiving the pricing information and displays the pricing information for its corresponding product.

Figure 9:
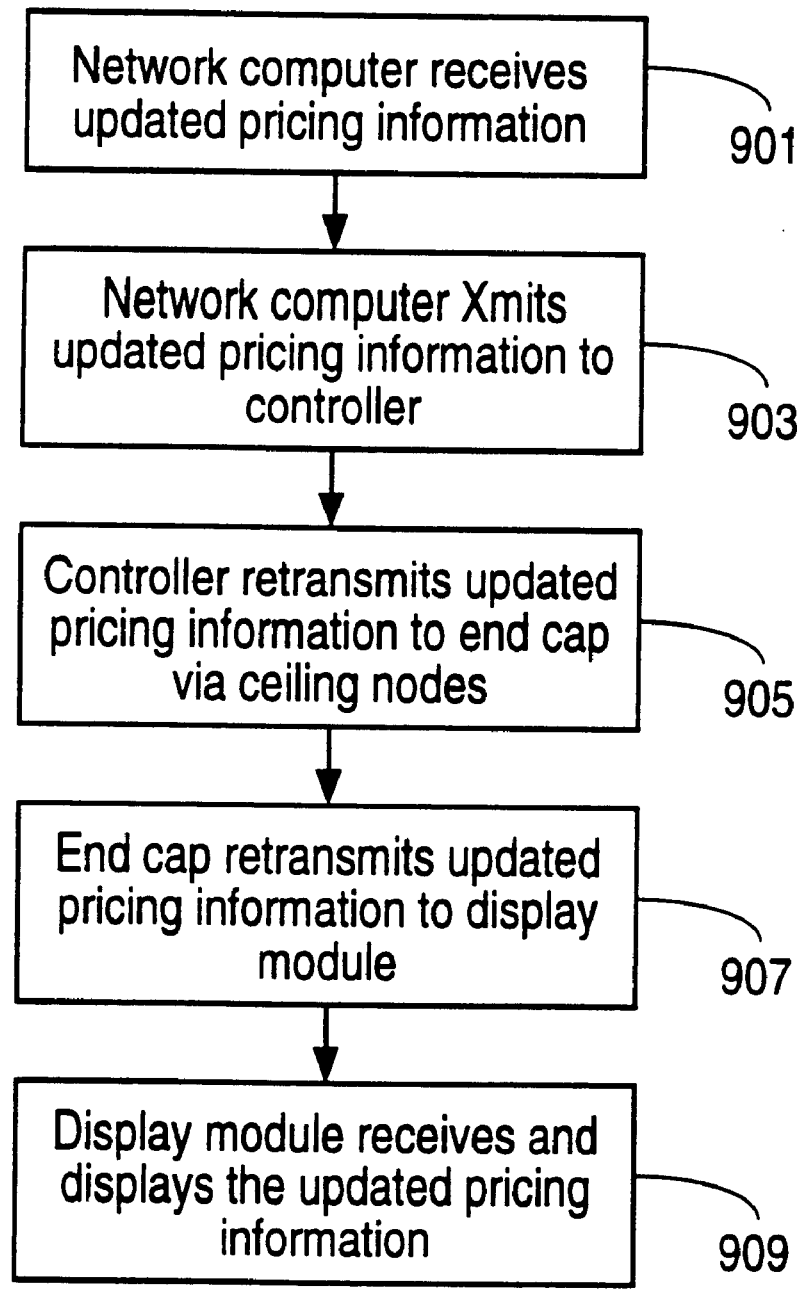
FIG. 9 shows a flow diagram of the process to update pricing information in the information display system.

FIG. 9 shows a flow diagram of the process to update pricing information in information display system 200. In step 901, network computer 210 (FIG. 2) is loaded with updated pricing information. These pricing updates may occur several times a day, according to the marketing needs of the user.

In step 903, for each product having its pricing information updated, network computer 210 transmits the updated pricing information and UPC to controller 110 (FIG. 2) over bus 211.

In step 905, controller 110 retransmits the pricing information to the appropriate end cap through the ceiling nodes via the IR downlink and bus 111, respectively.

In step 907, the end cap issues an acknowledgment to the controller over the RF uplink to confirm receipt of the message. The end cap retransmits the pricing information over the rail bus to the display module. If the message was received incorrectly, the end cap sends a "retransmit" message to the controller over the RF uplink.

In step 909, the display module receives and displays the pricing information for its corresponding product. The display module also sends an acknowledge message to the controller over the RF uplink within a specified time window of receiving the pricing information.

Figure 10:
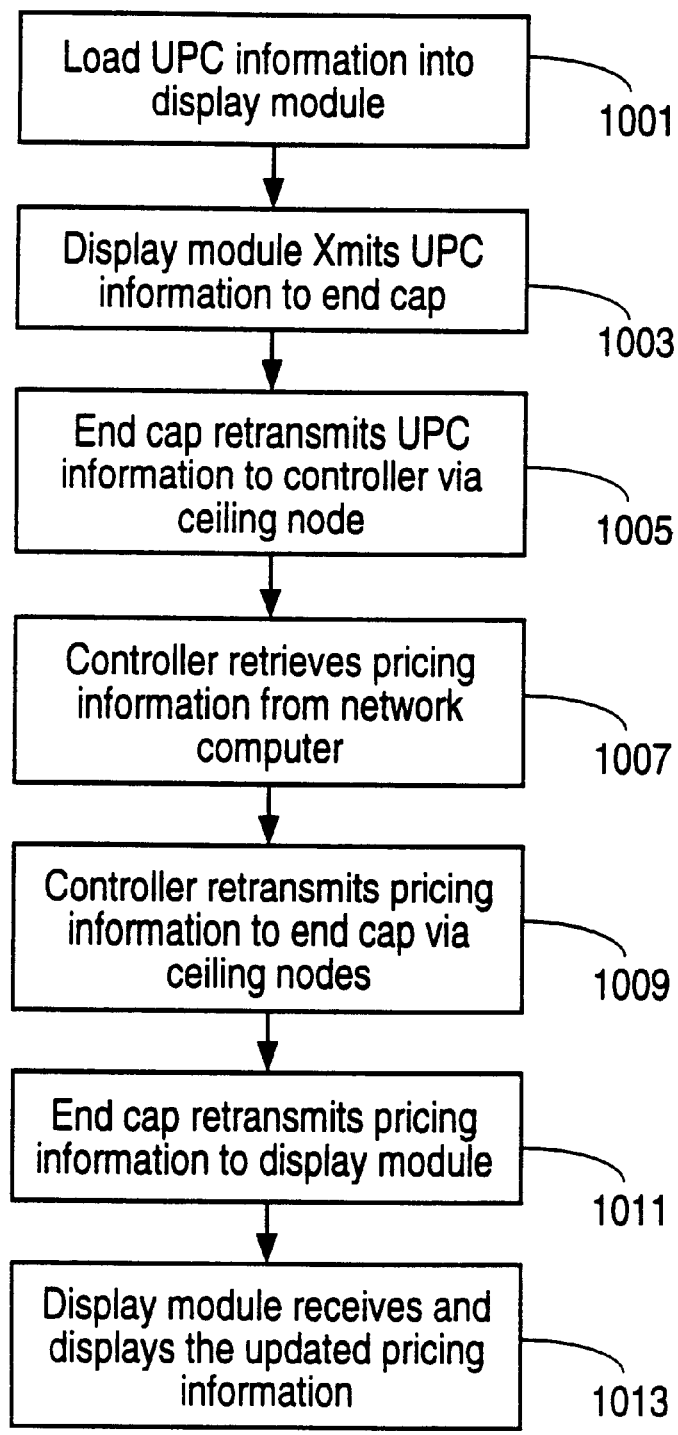
FIG. 10 shows a flow diagram of the process to reprogram a display module for a different product in the information display system.

FIG. 10 shows a flow diagram of the process to reprogram a display module for a different product in information display system 200. In step 1001, the user loads the UPC (or EAN or other unique identification code) information of the product into the display module by reading the UPC directly from the product container using the wand of a portable UPC reader and transmitting the UPC information into the display module by placing the wand on the display module's optical port.

In step 1003, the display module transmits the UPC information to the end cap over rail bus 250 (FIG. 2), which stores the UPC information in memory 690 (FIG. 6).

In step 1005, the end cap then sends the UPC information to controller 110 (FIG. 2) using the RF uplink to transmit the information to a ceiling node, which retransmits it to controller 110. The controller records the UPC information with the node number of the end cap so that it can later communicate with that particular end cap to update pricing information in the display module corresponding to the product having that UPC.

In step 1007, the controller communicates with network computer 210 (FIG. 2) over bus 211 to retrieve the pricing information for the product having that UPC.

In step 1009, the controller transmits the pricing information to a ceiling node, which retransmits the pricing information to the end cap over the IR downlink.

In step 1011, the end cap issues an acknowledgment to the controller over the RF uplink to confirm receipt of the message. If the information was received incorrectly, the end cap will send a "retransmit" message to the controller via the RF uplink. The end cap retransmits the pricing information over the rail bus to the display module.

In step 1013, the display module receives the pricing information, sends an acknowledge message to the controller over the RF uplink via end cap and ceiling node within a specified time window of receiving the pricing information and displays the price for its corresponding product.

Figure 11:
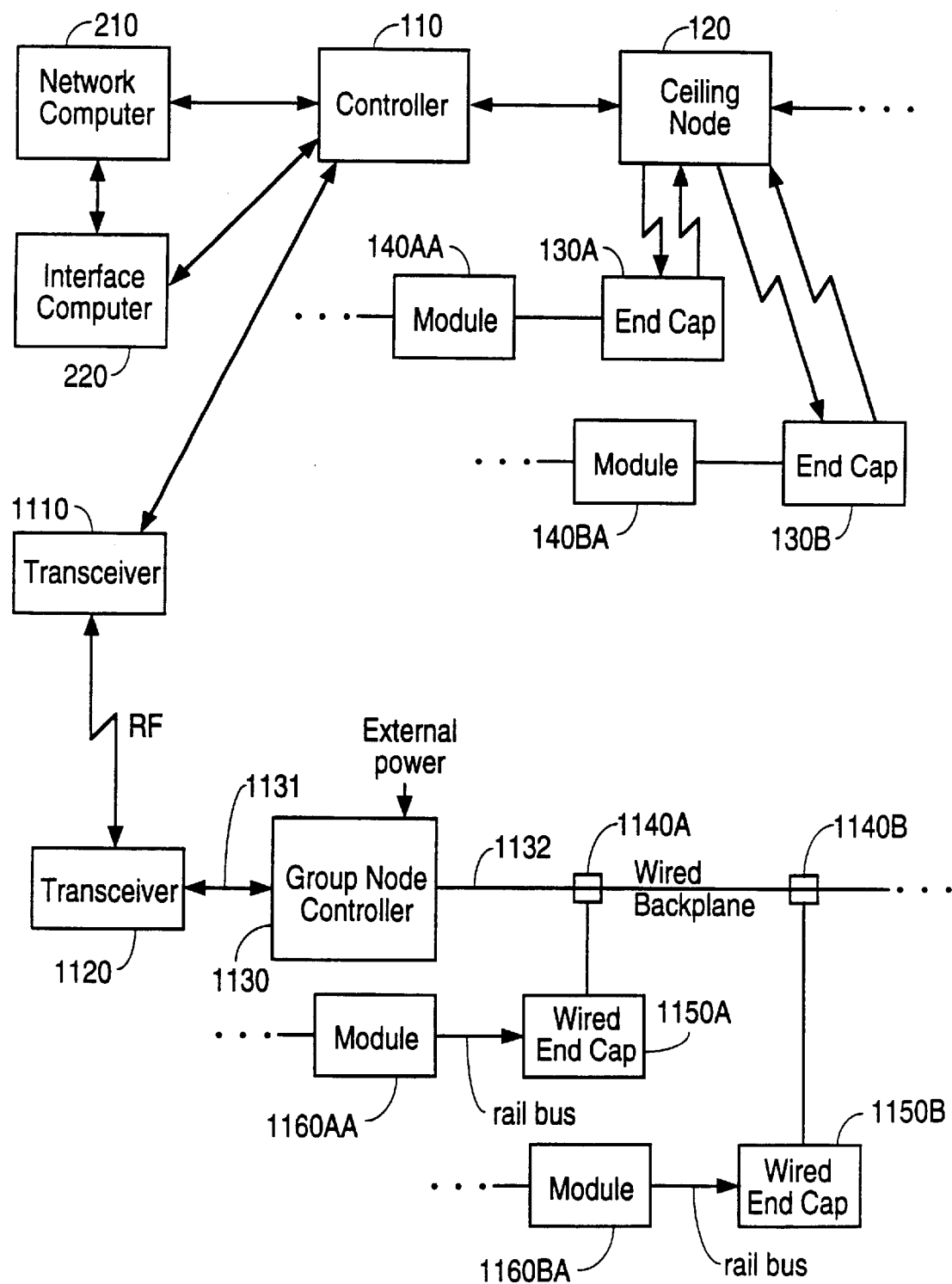
FIG. 11 shows a block diagram of an information display system according to another embodiment of the present invention, which uses a wired end cap subsystem.

FIG. 11 shows another embodiment according to the present invention similar to the embodiment of FIG. 2, with the addition of wired communication to some end caps. The wired end cap subsystem is disclosed in copending application Ser. No. 07/593,192 by Lincoln. Network computer 210 communicates to modules 1160AA, 1160BA, etc. by sending a message to interface computer 220 and controller 110. Modules 1160AA, 1160BA, etc. are addressed by UPC in the same manner as modules 140AA, etc., except that a group node controller 1130 replaces ceiling node 120, and wired-end caps 1150A, etc., replace end caps 130A, etc. Modules 1160AA, etc., may be identical to display modules 140AA, etc. Controller 110 retransmits the message to a transceiver 1110. In this embodiment, transceiver 1110 is a spread-spectrum RF transceiver such as model ProxLink II made by Proxim, although transceiver 1110 may be any type of wired or wireless transceiver. Transceiver 1110 broadcasts the message to a transceiver 1120, which is of the same type as transceiver 1110. Transceiver 1120 receives the message and retransmits it to group node controller 1130 over a bus 1131. Group node controller 1130 retransmits the message to the appropriate wired end cap over a bus 1132 through buffers 1140A, 1140B, etc. Buffers 1140 provide isolation for each wired end cap 1150A, etc., on bus 1132. The wired end cap receives the message and retransmits it to the appropriate module coupled to its rail bus. The module receives and displays the pricing information embedded in the message. Group node controller 1130, wired end caps 1150A, 1150B, etc. and modules 1160AA, 1160BA, etc. are powered externally from power lines in bus 1132. This embodiment is advantageously used in areas where solar powered wireless display modules are not practical, or in areas where the user expects to keep the shelving in place a relatively long time. For example, this embodiment may be advantageously used in a freezer section.

Figure 12:
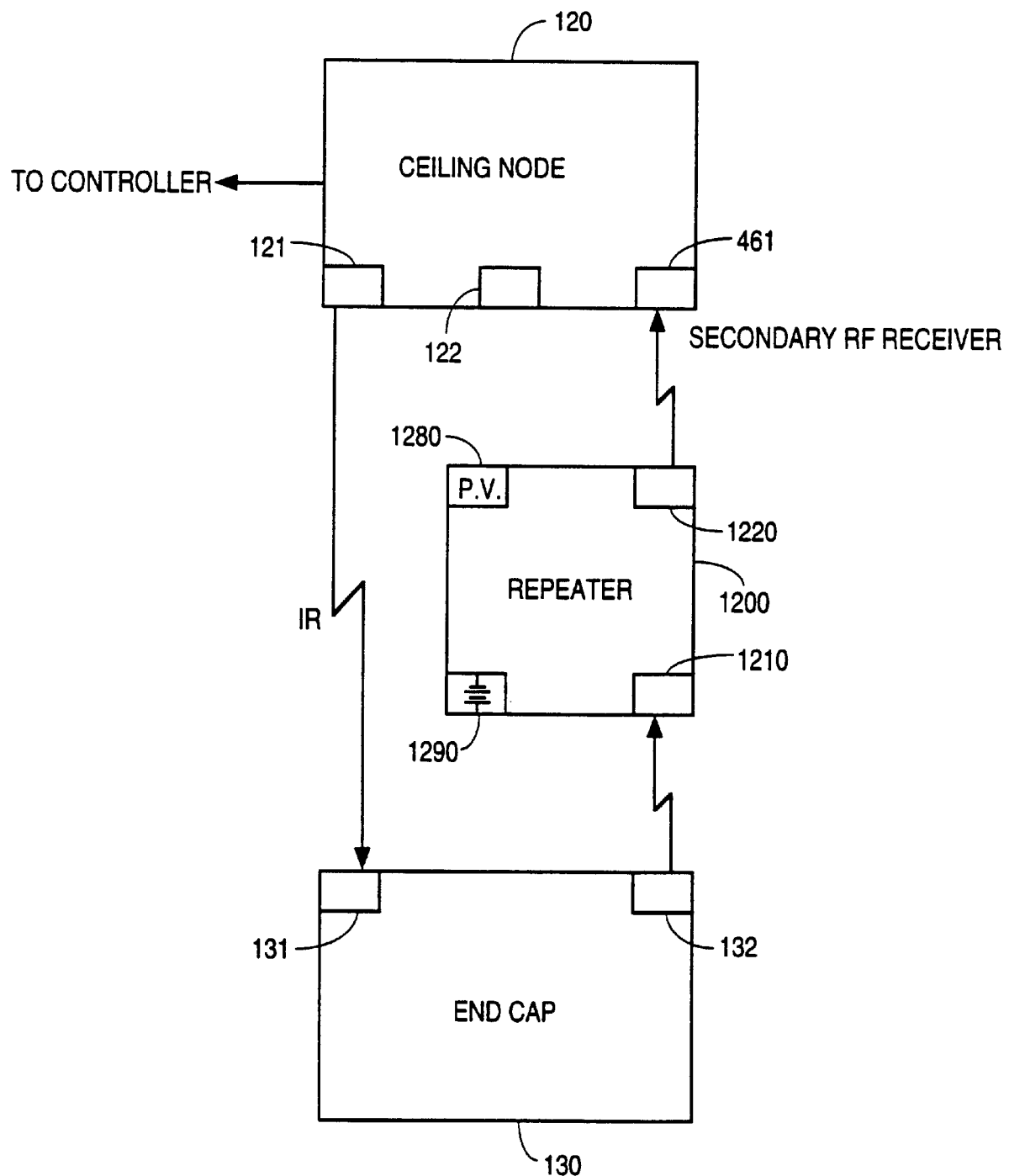
FIG. 12 shows a block diagram of an information display system according to another embodiment of the present invention, which uses a repeater in the RF up link.

FIG. 12 shows another embodiment of the present invention using a repeater 1200 in the RF uplink. End cap 130 communicates with controller 110 (FIG. 2) by broadcasting an RF message signal. Repeater 1200 receives this RF message using an RF receiver 1210. Repeater 1200 then retransmits the message using an RF transmitter 1220 over a secondary frequency, which ceiling node 120 receives using a secondary RF receiver 461. Ceiling node 120 communicates with controller 110 as previously described. End cap 130 continues to receive IR signals directly from ceiling node 120 (or remote IR emitters). Repeater 1200 may also be powered by a photovoltaic (solar) cell 1280 where external power is not practical. Repeater 1200 may optionally include an energy storage device 1290. Energy storage device 1290 may be rechargeable, and may be recharged by photovoltaic cell 1280.

Figure 12A:
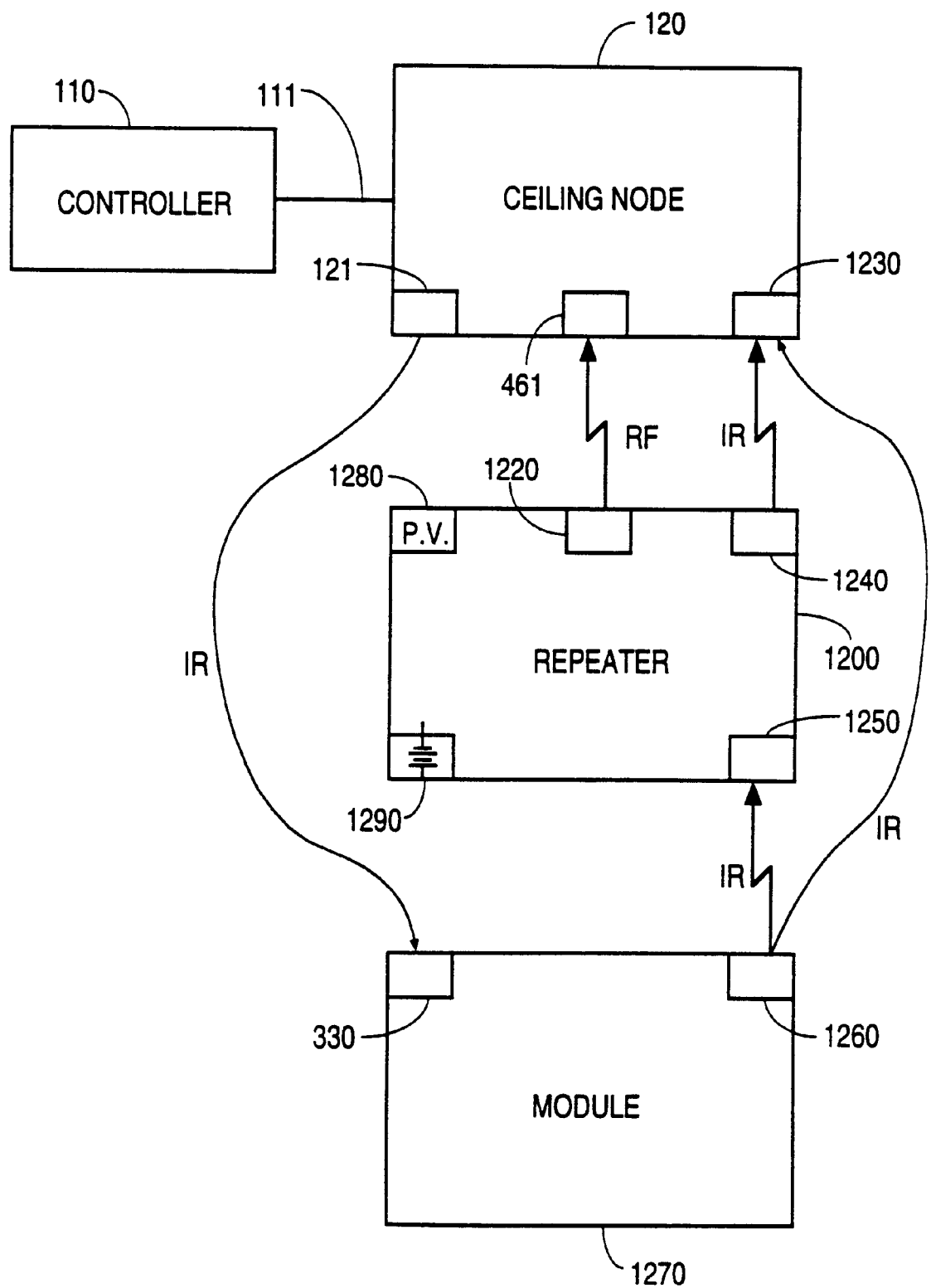
FIG. 12A shows a block diagram of another embodiment of a repeater.

FIG. 12A shows another embodiment of the communications repeater for retransmitting messages from modules or end caps up to the ceiling node. Module 1270 communicates with controller 110 (FIG. 2) by broadcasting an IR message signal via IR transmitter 1260. Repeater 1201 receives this IR message using an IR receiver 1250. Repeater 1201 then delays a fixed time increment and retransmits the message using an IR transmitter 1240 which ceiling node 120 receives using IR receiver 1230. Repeater 1201 may alternatively retransmit the message using an RF transmitter 1220 over a secondary frequency, which ceiling node 120 receives using a secondary RF receiver 461. Ceiling node 120 communicates with controller 110 as previously described. Module 1270 continues to receive IR signals directly from ceiling node 120 (or remote IR emitters). Repeater 1201 may also be powered by photovoltaic (solar) cell 1280 where external power is not practical. Repeater 1200 may incorporate an energy storage device 1290. In such cases this energy storage device may be rechargeable, and may be recharged from the photovoltaic (solar) cell 1280.

Figure 13:
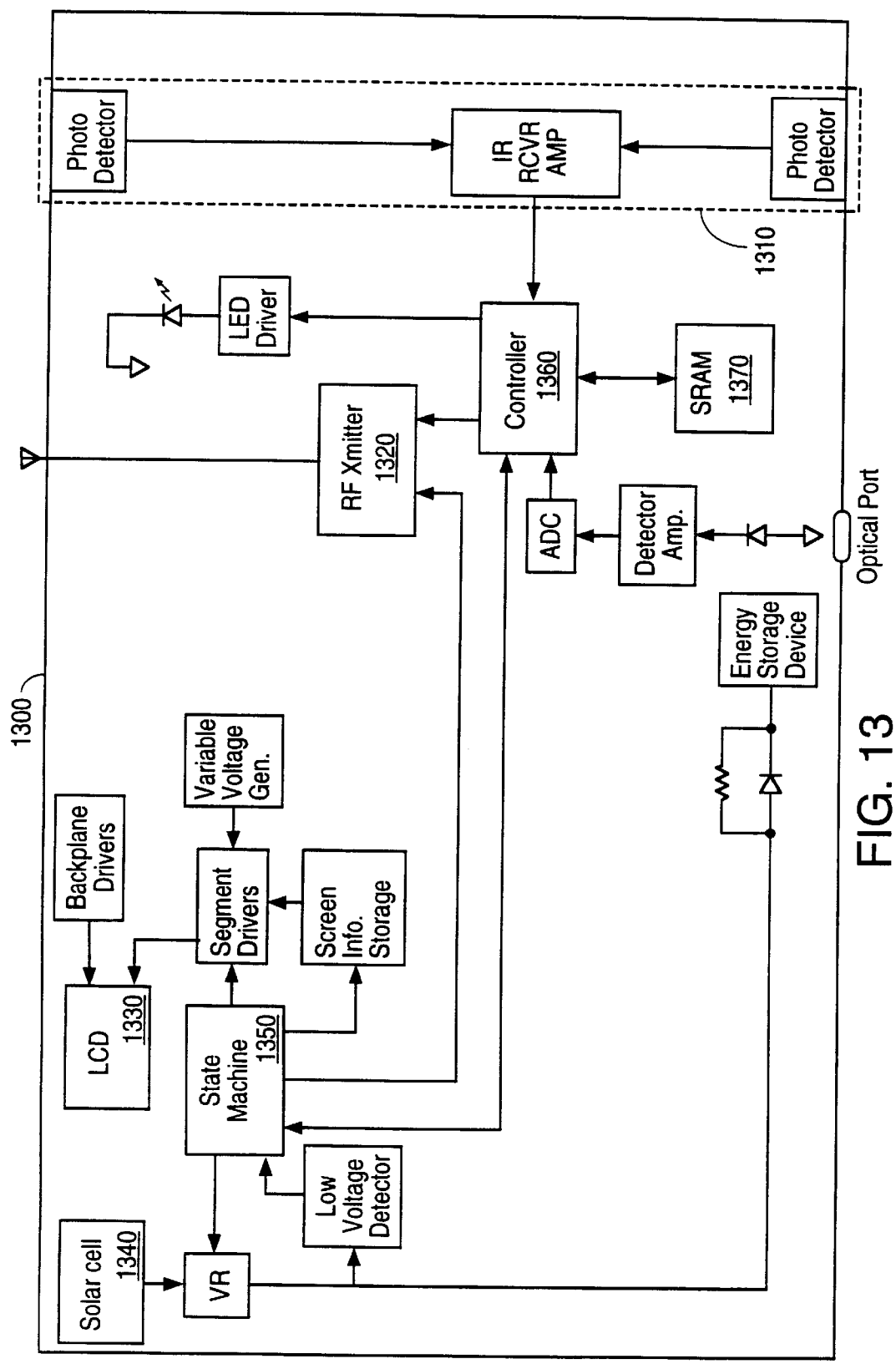
FIG. 13 shows a block diagram of a stand-alone display module according to one embodiment of the present invention.

FIG. 13 shows another embodiment of the present invention using a stand-alone display module 1300. In this embodiment, display module 1300 is substantially identical with display module 140AA (FIG. 3A) and end cap 130 integrated together. Stand-alone display module 1300 is advantageously used in areas where end caps and rails are not practical (e.g., the supermarket's deli section).

The foregoing has described the principles and preferred embodiments of the present invention. However, the invention should not be construed as being limited to the particular embodiments described. For example, some embodiments include different combinations of wired end cap subsystems, repeater subsystems, and stand alone display modules in conjunction with the standard wireless end cap system. Thus the above-described embodiments should be regarded as illustrative rather than restrictive. Variations can be made to those embodiments by workers skilled in the art without departing from the scope of the present invention as defined by the following claims.

We claim:

1. A system for displaying product information, comprising:
   a controller;
   a ceiling node having IR transmitter and an RF receiver;
   a first bus coupling said controller and said ceiling node for carrying messages between said controller and said ceiling node;
   an end cap having IR receiver and RF transmitter, said end cap being mounted to a display shelf or gondola;
   an individually addressable display module;
   a rail for mounting said end cap and said individually addressable display module;
   a second bus for carrying messages between said end cap and said individually addressable display module;
   a third bus for carrying power, said individually addressable display module coupled to said third bus;
   wherein said IR transmitter consumes more power than said IR receiver when said IR transmitter and IR receiver are operative, and said RF receiver consumes more power than said RF transmitter when said RF transmitter and RF receiver are operative.

2. The system of claim 1, wherein said individually addressable display module is solar powered.

3. The system of claim 1, wherein said end cap is solar powered.

4. The system of claim 1, wherein said end cap further comprises a memory for storing an address and display information of said individually addressable display module.

5. The system of claim 1, wherein said end cap and said individually addressable display module form an end cap group and wherein said end cap group has a unique serial address number by which said controller addresses said end cap group.

6. The system of claim 1, wherein said end cap is powered by an energy storage device.

7. The system of claim 6, where said energy storage device is rechargeable.

8. The system of claim 1 further comprising a repeater for receiving RF messages from said end cap and retransmitting said RF messages received from said end cap to said ceiling node over an RF channel.

9. The system of claim 8, wherein said repeater is solar powered.

10. The system of claim 8, wherein said repeater is powered by an energy storage device.

11. The system of claim 10, wherein said energy storage device is rechargeable.

12. A system for displaying product information comprising:
    a controller;
    a ceiling node having an IR transmitter and an RF receiver;
    a first bus coupling said controller and said ceiling node for carrying messages between said controller and said ceiling node; and
    an individually addressable display module having an IR receiver and an RF transmitter;
    wherein said IR transmitter consumes more power than said IR receiver when said IR transmitter and IR receiver are operative, and said RF receiver consumes more power than said RF transmitter when said RF transmitter and RF receiver are operative.

13. The system of claim 12, wherein said individually addressable display module is solar powered.

14. The system of claim 12, wherein said system is further comprised of an end cap having an IR receiver and an RF transmitter for wirelessly communicating with said ceiling node.

15. The system of claim 12, wherein said individually addressable display module is also powered by an energy storage device.

16. The system of claim 15, wherein said energy storage device is rechargeable.

17. The system of claim 12, further comprising a repeater for receiving IR messages from said solar powered display module and retransmitting said messages received from said solar powered display module to said ceiling node over an RF channel.

18. The system of claim 17, wherein said repeater is solar powered.

19. The system of claim 17, wherein said repeater is powered by an energy storage device.

20. The system of claim 19, wherein said energy storage device is rechargeable.

21. A system for displaying product information comprising:
   a controller;
   a ceiling node capable of transmitting and/or receiving wireless communications;
   a first bus coupling said controller and said ceiling node for carrying messages between said controller and said ceiling node;
   a plurality of individually addressable display modules for displaying product information, each of said individually addressable display modules comprising a solar power source;
   a rail for mounting said plurality of individually addressable display modules; and
   a second bus for carrying power between modules in said plurality of individually addressable display modules, whereby power from the solar power source within at least a first module of said plurality of individually addressable display modules is carried to supply a second module of said plurality of individually addressable display modules to supplement power available from the solar power source within said second module.

22. The system of claim 21, further comprising an end cap coupled to said rail and connected to said second bus, said end cap having an energy storage device and receiving power from said solar power sources of said plurality of individually addressable display modules.

23. The system of claim 22, wherein said end cap monitors and controls the operation of said end cap to adapt the power consumption of said end cap to the power available from said energy storage device.

24. The system of claim 21, further comprising an end cap with a rechargeable energy storage device, said end cap coupled to said rail and connected to said second bus, wherein said rechargeable energy storage device is charged by power from said plurality of individually addressable display modules.

25. The system of claim 24, wherein power from said end cap is shared with said plurality of individually addressable display modules.

26. A method of changeably displaying information in an information display system comprising a controller, a ceiling node, a first bus coupling said controller and said ceiling node for carrying messages between said controller and said ceiling node, an end cap, and a display module, said method comprising the steps of:
   transmitting information from said controller to said ceiling node over said first bus;
   retransmitting said information transmitted to said ceiling node from said ceiling node to said end cap using an IR downlink;
   transmitting a first acknowledge message acknowledging receipt of said information from said end cap to said ceiling node over an RF uplink;
   retransmitting said information retransmitted to said end cap to said display module over a second bus;
   displaying said information on said display module;
   transmitting a second acknowledge message acknowledging receipt of said information from said display module to said end cap over said second bus; and
   retransmitting said second acknowledge message from said end cap to said ceiling node using said RF uplink;
   wherein retransmitting said information transmitted to said ceiling node from said ceiling node to said end cap using said IR downlink is performed at a first power level, transmitting said first acknowledge message acknowledging receipt of said information from said end cap to said ceiling node over said RF uplink is performed at a second power level, and said first power level is greater than said second power level.

* * * * *